United States Patent
Chu et al.

(10) Patent No.: US 11,748,513 B2
(45) Date of Patent: *Sep. 5, 2023

(54) POLICY BASED NOTIFICATION PROTECTION SERVICE IN WORKSPACE

(71) Applicant: Citrix Systems, Inc., Fort Lauderdale, FL (US)

(72) Inventors: Xiaolu Chu, Nanjing (CN); Dai Li, Nanjing (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/521,495

(22) Filed: Nov. 8, 2021

(65) Prior Publication Data

US 2022/0067197 A1 Mar. 3, 2022

Related U.S. Application Data

(63) Continuation of application No. 16/238,972, filed on Jan. 3, 2019, now Pat. No. 11,170,126.

(51) Int. Cl.
| | |
|---|---|
| *G06F 21/62* | (2013.01) |
| *H04W 12/63* | (2021.01) |
| *G06F 9/54* | (2006.01) |
| *H04L 67/01* | (2022.01) |
| *H04L 67/55* | (2022.05) |
| *H04W 12/64* | (2021.01) |

(52) U.S. Cl.
CPC .......... *G06F 21/6245* (2013.01); *G06F 9/542* (2013.01); *H04L 67/01* (2022.05); *H04L 67/55* (2022.05); *H04W 12/63* (2021.01); *H04W 12/64* (2021.01)

(58) Field of Classification Search
CPC .... G06F 21/6245; G06F 21/10; G06F 21/123; G06F 21/35; G06F 9/542; H04L 67/26; H04L 67/28; H04L 67/42
See application file for complete search history.

(56) References Cited

U.S. PATENT DOCUMENTS

| 7,437,765 B2 | 10/2008 | Elms et al. |
| 9,536,073 B2 | 1/2017 | Thomas |
| (Continued) | | |

FOREIGN PATENT DOCUMENTS

| JP | 2007-180804 A | 7/2007 |
| JP | 2008-046880 A | 2/2008 |
| (Continued) | | |

OTHER PUBLICATIONS

International Preliminary Report on Patentability on KR Appl. No. 10-2021-7023725, dated Feb. 23, 2022.
(Continued)

*Primary Examiner* — Hosuk Song

(57) ABSTRACT

Systems and methods described herein provide for management of notifications. A server may receive proximity information indicative of a distance between the client device and a user of the client device, and idle state information of the client device. The server may determine a notification protection level using the proximity information and the idle state information. The server may receive a notification from the at least one notification source. The notification is for rendering on a screen of the client device. The notification manager may manage delivery of the received notification, according to the determined notification protection level.

20 Claims, 3 Drawing Sheets

(56) References Cited

U.S. PATENT DOCUMENTS

| | | | |
|---|---|---|---|
| 9,854,425 B2* | 12/2017 | Narang | H04L 12/2803 |
| 9,923,923 B1 | 3/2018 | Sharifi Mehr et al. | |
| 9,979,724 B2* | 5/2018 | Tunnell | H04W 4/70 |
| 10,198,594 B2 | 2/2019 | Zhang et al. | |
| 10,296,762 B2 | 5/2019 | Shimizu | |
| 10,299,304 B1 | 5/2019 | Hintermeister et al. | |
| 10,318,759 B2* | 6/2019 | Vähä-Sipilä | G06F 21/6281 |
| 10,467,551 B2 | 11/2019 | Gayton et al. | |
| 10,630,630 B1 | 4/2020 | Khawand et al. | |
| 10,657,241 B2* | 5/2020 | Farraro | H04W 4/80 |
| 10,706,173 B2 | 7/2020 | Zhang et al. | |
| 10,853,459 B2* | 12/2020 | Foster | G06F 21/6245 |
| 11,170,126 B2* | 11/2021 | Chu | H04W 12/60 |
| 11,481,480 B2* | 10/2022 | Conde | G06V 40/172 |
| 2007/0300306 A1 | 12/2007 | Hussain | |
| 2014/0047461 A1 | 2/2014 | Lee et al. | |
| 2015/0141066 A1 | 5/2015 | Ramanujam et al. | |
| 2015/0332439 A1 | 11/2015 | Zhang et al. | |
| 2017/0063750 A1 | 3/2017 | Vardhan et al. | |
| 2017/0177423 A1 | 6/2017 | Bradley et al. | |
| 2017/0185650 A1 | 6/2017 | Vainas et al. | |
| 2017/0277361 A1 | 9/2017 | Schulze et al. | |
| 2018/0018474 A1 | 1/2018 | Shimizu | |
| 2018/0091465 A1 | 3/2018 | Faaborg et al. | |
| 2018/0288178 A1 | 10/2018 | Gupta | |
| 2018/0359207 A1 | 12/2018 | Chatterjee et al. | |
| 2019/0020687 A1 | 1/2019 | Noon et al. | |
| 2019/0050600 A1 | 2/2019 | Sahoo et al. | |
| 2019/0065777 A1 | 2/2019 | Ravuvari et al. | |
| 2019/0109917 A1 | 4/2019 | Milanese et al. | |
| 2019/0250932 A1 | 8/2019 | Valtchev | |
| 2019/0266033 A1 | 8/2019 | Sharifi et al. | |
| 2020/0028956 A1 | 1/2020 | Adderly et al. | |
| 2020/0036668 A1 | 1/2020 | Bendi et al. | |
| 2020/0127960 A1 | 4/2020 | Khawand et al. | |
| 2020/0134601 A1 | 4/2020 | Ding et al. | |

FOREIGN PATENT DOCUMENTS

| | | | |
|---|---|---|---|
| JP | 2008-186473 A | 8/2008 | |
| JP | 2012-150816 A | 8/2012 | |
| JP | 2014-044686 A | 3/2014 | |
| JP | 2018-005744 A | 1/2018 | |
| WO | WO-2009/096015 A1 | 8/2009 | |
| WO | WO-2012/132296 A1 | 10/2012 | |
| WO | WO-2015/045130 A1 | 4/2015 | |
| WO | WO-2017/034746 A1 | 3/2017 | |
| WO | WO-2020/142580 A1 | 7/2020 | |

OTHER PUBLICATIONS

International Preliminary Report on Patentability on PCT Appl. No. PCT/US2020/034876 dated Dec. 23, 2021.
Notice of Allowance on U.S. Appl. No. 16/436,372 dated Dec. 17, 2021.
Final Office Action on U.S. Appl. No. 16/436,372 dated Dec. 18, 2020.
Final Office Action on U.S. Appl. No. 16/436,372 dated Sep. 21, 2021.
International Preliminary Report on Patentability on PCT Appl. No. PCT/US2020/012013 dated Jul. 15, 2021.
International Search Report and Written Opinion for PCT Appl. No. PCT/US2020/012013 dated Mar. 27, 2020.
International Search Report and Written Opinion on PCT Application No. PCT/US2020/034876, dated Sep. 1, 2020.
Non Final Office Action on U.S. Appl. No. 16/436,372 dated Apr. 27, 2021.
Non-Final Office Action on U.S. Appl. No. 16/238,972 dated Mar. 11, 2021.
Non-Final Office Action on U.S. Appl. No. 16/436,372, dated Jun. 25, 2020.
Notice of Allowance on U.S. Appl. No. 16/238,972, dated Sep. 15, 2021.
Examination Report on AU Appl. No. 2020205064 dated Jun. 30, 2022.
Examination Report on AU Appl. No. dated Nov. 17, 2022 (4 pages).
Examination Report on CA Appl. No. 3125693, dated Nov. 3, 2022 (5 pages).
First Office Action for JP Appl. No. 2021-538748, dated Sep. 7, 2022 (5 pages).

* cited by examiner

POLICY BASED NOTIFICATION PROTECTION SERVICE IN WORKSPACE

CROSS-REFERENCE TO RELATED APPLICATION

This application is a continuation of and claims priority to and the benefit of U.S. patent application Ser. No. 16/238,972, titled "POLICY BASED NOTIFICATION PROTECTION SERVICE IN WORKSPACE," and filed on Jan. 3, 2019, the contents of all of which are hereby incorporated herein by reference in its entirety for all purposes.

FIELD OF THE DISCLOSURE

The present application generally relates to computing and client devices, including but not limited to the use of policies to manage notifications for such devices.

BACKGROUND

Various computing and client devices may receive notifications. Such client devices may receive notifications from a notification source. The notifications may be displayed on such a client device and can include sensitive information.

BRIEF SUMMARY

The present disclosure is directed towards systems and methods for managing delivery of notifications. The embodiments described herein protect notifications aggregated from multiple sources such as native installed applications, virtualized applications, Software as a Service (SaaS) applications, etc. The embodiments described herein can manage notifications by introducing a policy-based service framework (also sometimes referred to herein as a policy engine). The policy engine may be configured to enable, disable, rewrite or otherwise modify notifications in various context-based scenarios. Such embodiments may protect and secure user devices and/or workspaces from inadvertently exposing information to unintended recipients.

Many mobile device (or other client device) vendors are providing features for protecting device security and implementing data loss prevention (DLP) strategies. Some mobile devices include features, such as facial recognition systems or other biometric detection systems for 4878-2219-2129.1 unlocking the user's client device (and even, in some implementations, using applications and features within the client device) to prevent unauthorized use of the client device. On the other hand, some application and device vendors leverage notifications for informing end users of information in real time. To this end, some client devices may render (e.g., display or present) notifications even while the client device is in a locked screen mode (e.g., with the assumption that a user that is with or near the client device can be alerted or notified via the notifications). As a result, security and/or privacy issues are introduced because notifications may be rendered while a user is away from their client device and the device may be located in a public or otherwise non-private environment. The notifications may include sensitive information and private data such as, for instance, chat conversations, incoming email senders and email bodies, meeting requests, rendezvous locations, and so forth. As one example, some enterprise proprietary or otherwise private information may be pushed to a client device. Where the user is away from their client device, the information may be inadvertently disclosed to others outside and/or not affiliated with the enterprise (e.g., to an untrusted recipient) rather than remaining internal to the organization.

On one hand, while users are away from their client devices, applications may continue to display notifications received either via a cloud notification push service or via an application background refresh (e.g., set within pre-configured settings for the client device). As such, privacy of such notifications may be compromised through inadvertent leaking of information to others while the notifications are rendered on the device while a person is away from their device. To address privacy concerns, a user may disable notification settings on their client devices. However, such actions may negatively impact the utility and benefits of notifications, as well as user friendliness, as most users are accustomed to receiving notifications.

The present disclosure presents solutions over currently implemented systems and methods by selectively rendering, modifying, or blocking/disabling notifications rendered on a client device based on a determinable or estimated location of a user of the client device, and/or a state of the client device for instance. The systems and methods described herein can provide a policy-based notification protection framework to secure precise or detailed notification information. The systems and methods can employ a policy engine for identifying information in a notification and various protection techniques. The policy engine can determine and assign a protection level (sometimes referred to as a risk level) to various notifications. The policy engine may rewrite, remove or modify content or information within the notification, thus eliminating the likelihood of inadvertent disclosure of sensitive information within a notification. The policy engine may use various factors for determining whether to display or render notifications, modify a notification's content, or block a notification all together. Such factors may include, for instance, geographic information (e.g., global positioning system (GPS) or similar data), idle state of the client device, and so forth.

In one aspect, the present disclosure is directed to a notification server (sometimes referred to as a server or computing device) in communication with a client device and/or at least one notification source. The notification server can include a policy engine and notification manager. The notification server can include a memory, and one or more processors operatively coupled to the memory. The one or more processors can implement the policy engine and/or the notification manager. The policy engine (or the one or more processors) can receive first information (or proximity information) indicative of a distance or proximity between the client device and a user (e.g., an authorized user) of the client device, and second information (or idle state information) of the client device (e.g., idle state information of at least one of: the client device or an application executing on the client device). The policy engine can determine a notification protection level using the first information and the second information. The notification manager can receive a first notification from the at least one notification source. The first notification can be for rendering on at least a screen of the client device. The notification manager can manage delivery of (e.g., allow, modify or block) the received first notification, according to the determined notification protection level, e.g., to ensure privacy of the notification.

In some embodiments, the policy engine (or the one or more processors) can determine the notification protection level using the first information, the second information and third information. The third information can include contextual information about at least one of the client device or the application. In some embodiments, the third information comprises at least one of: duration of the client device being in a stationary state, duration of the screen being in a darkened or low-power state, duration of the client device being in a locked state, whether the screen is covered by an accessory cover, duration since the client device was last unlocked, battery level of the client device, reputation of the application, category of the application, time or day of the notification, positioning-related information of the client device, whether the client device is in a trusted zone, or a Wi-Fi network of the client device.

In some embodiments, the policy engine can receive the first (or proximity) information or to determine the notification protection level, responsive to the notification manager (or the computing device, or the one or more processors) receiving the first notification. In some embodiments, the policy engine can compare the notification protection level with a threshold, and the notification manager is configured to allow, modify or block the received first notification according to the comparison. In some embodiments, the notification server is in communication with each of a plurality of notification sources via a corresponding application programming interface (API) of the notification server. In some embodiments, the at least one notification source includes a Software-as-a-Service (SaaS) application, a virtual desktop, or a virtual application.

In some embodiments, the notification manager can modify the received notification by at least one of removing, encoding or obfuscating at least part of a content of the notification. In some embodiments, the notification manager can at least one of: block the received first notification from the client device, deactivate notifications on the client device, or deactivate a feature of the client device for preview of message content, if the notification manager is incapable of modifying the received first notification according to the determined notification protection level. In some embodiments, the notification manager can receive the first notification from the at least one notification source. The first notification may be for rendering on a screen of each of a plurality of client devices. The notification manager may, for each of the plurality of client devices, allow, modify or block the received first notification according to a notification protection level determined for the corresponding client device.

According to another aspect of the disclosure, described is a method for managing delivery of notifications. The method can include receiving, by a notification server (sometimes referred to as a server or computing device) in communication with a client device and/or at least one notification source, a notification from the at least one notification source. The first notification may be for rendering on at least a screen of the client device. The method can include receiving, by the notification server, first information (or proximity information) indicative of a distance or proximity between the client device and a user (e.g., an authorized user) of the client device, and second information (e.g., idle state information) of at least one of: the client device or an application executing on the client device. The method can include determining, by the notification server, a notification protection level using the first information and the second information. The method can include allowing, modifying or blocking the received first notification, according to the determined notification protection level.

In some embodiments, the method further includes determining the notification protection level using the first information, the second information and third information. The third information can include contextual information about at least one of the client device or the application. In some embodiments, the method further includes receiving the first information or determining the notification protection level, responsive to receiving the first notification. In some embodiments, the method further includes comparing, by the notification server, the notification protection level with a threshold, and allowing, modifying or blocking the received first notification according to the comparison. In some embodiments, the at least one notification source comprises a Software-as-a-Service (SaaS) application, a virtual desktop, or a virtual application.

In some embodiments, the method further includes modifying the received first notification by at least one of removing, encoding or obfuscating at least part of a content of the notification. In some embodiments, the method further includes blocking the received first notification from the client device, deactivating notifications on the client device, or deactivating a feature of the client device for preview of message content, if the notification server is incapable of modifying the received first notification according to the determined notification protection level. In some embodiments, the method further includes receiving the first notification from the at least one notification source, the first notification for rendering on a screen of each of a plurality of client devices. The method may further include, for each of the plurality of client devices, allowing, modifying or blocking the received first notification according to a notification protection level determined for the corresponding client device.

According to another aspect of the disclosure, a non-transitory computer readable medium is described. The non-transitory computer readable medium can store program instructions. The instructions can cause one or more processors to receive, at a notification server (sometimes referred to as a server or computing device) in communication with a client device and/or at least one notification source, a first notification from the at least one notification source, the first notification for rendering on at least a screen of the client device. The instructions can cause the one or more processors to receive, at the notification server, first information (e.g., proximity information) indicative of a distance or proximity between the client device and an authorized user of the client device, and second information (e.g., idle state information) of at least one of: the client device or an application executing on the client device. The instructions can cause the one or more processors to determine, at the notification server, a notification protection level using the first information and the second information. The instructions can cause the one or more processors to allow, modify or block the received first notification, according to the determined notification protection level.

In some embodiments, the program instructions further cause the one or more processors to receive the first notification from the at least one notification source, the first notification for rendering on a screen of each of a plurality of client devices. The program instruction may further cause the one or more processors to, for each of the plurality of client devices, allow, modify or block the received first notification according to a notification protection level determined for the corresponding client device.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1:
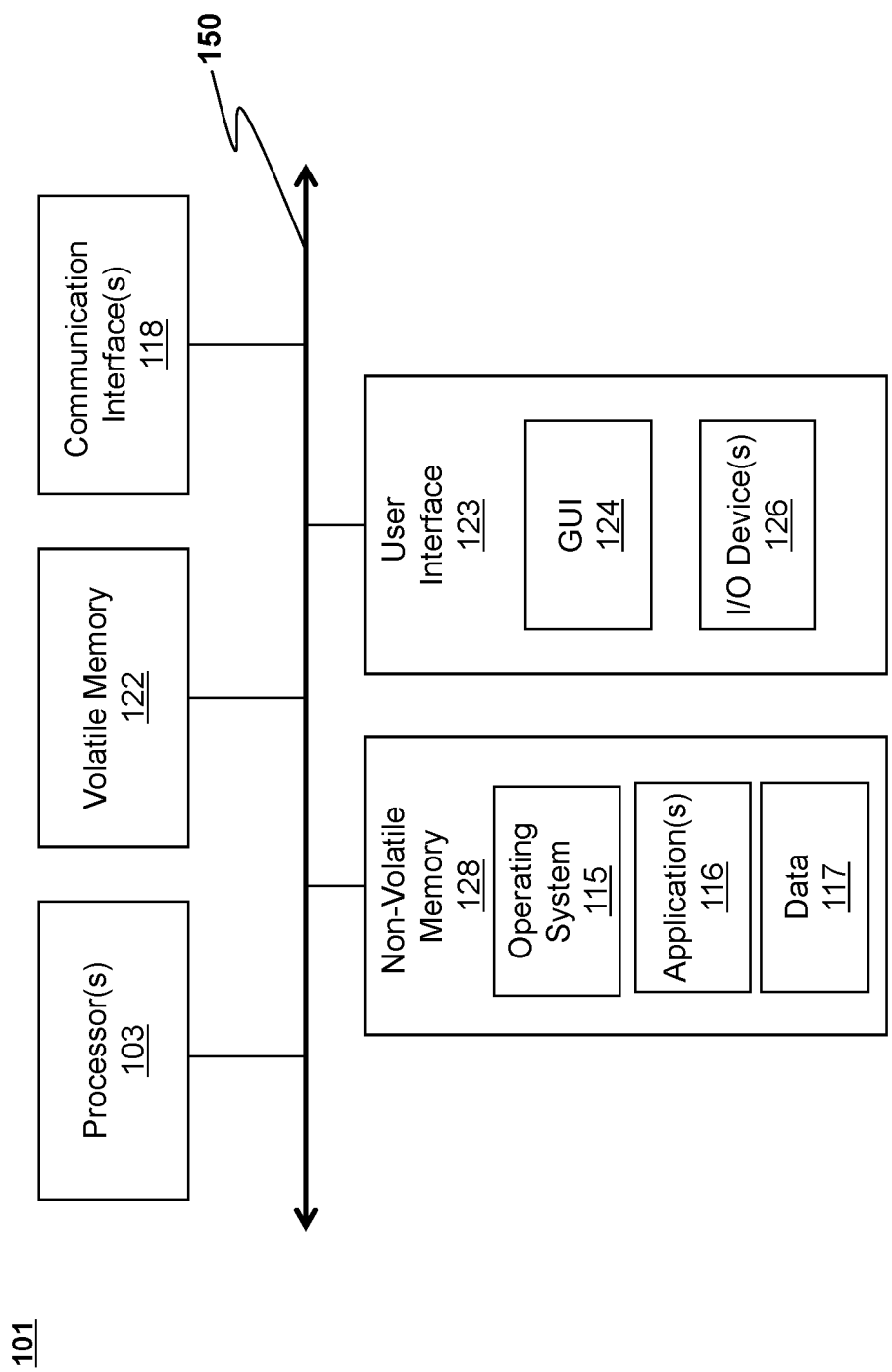
FIG. 1 is a block diagram of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for managing notifications.

A. Computing Environment

Prior to discussing the specifics of embodiments of the systems and methods detailed herein in Section B, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Managing Delivery of Notifications

The present disclosure is directed towards systems and methods for managing delivery of notifications. The embodiments described herein protect notifications aggregated from multiple sources such as native installed applications, virtualized applications, Software as a Service (SaaS) applications, etc. The embodiments described herein can manage notifications by introducing a policy-based service framework (also sometimes referred to herein as a policy engine). The policy engine may be configured to enable, disable, rewrite or otherwise modify notifications in various context-based scenarios. Such embodiments may protect and secure user devices and/or workspaces from inadvertently exposing information to unintended recipients.

Many mobile device (or other client device) vendors are providing features for protecting device security and implementing data loss prevention (DLP) strategies. Some mobile devices include features, such as facial recognition systems or other biometric detection systems for unlocking the user's client device (and even, in some implementations, using applications and features within the client device) to prevent unauthorized use of the client device. On the other hand, some application and device vendors leverage notifications for informing end users of information in real time. To this end, some client devices may render (e.g., display or present) notifications even while the client device is in a locked screen mode (e.g., with the assumption that a user that is with or near the client device can be alerted or notified via the notifications). As a result, security and/or privacy issues are introduced because notifications may be rendered while a user is away from their client device and the device may be located in a public or otherwise non-private environment. The notifications may include sensitive information and private data such as, for instance, chat conversations, incoming email senders and email bodies, meeting requests, rendezvous locations, and so forth. As one example, some enterprise proprietary or otherwise private information may be pushed to a client device. Where the user is away from their client device, the information may be inadvertently disclosed to others outside and/or not affiliated with the enterprise (e.g., to an untrusted recipient) rather than remaining internal to the organization.

On one hand, while users are away from their client devices, applications may continue to display notifications received either via a cloud notification push service or via an application background refresh (e.g., set within pre-configured settings for the client device). As such, privacy of such notifications may be compromised through inadvertent leaking of information to others while the notifications are rendered on the device while a person is away from their device. To address privacy concerns, a user may disable notification settings on their client devices. However, such actions may negatively impact the utility and benefits of notifications, as well as user friendliness, as most users are accustomed to receiving notifications (e.g., of incoming text or email messages, or application updates on their mobile devices).

The present disclosure presents solutions over currently implemented systems and methods by selectively rendering, modifying, or blocking/disabling notifications rendered on a client device based on a determinable or estimated location of a user of the client device, and/or a state of the client device for instance. The systems and methods described herein can provide a policy-based notification protection framework to secure precise or detailed notification information, or limit the amount of such information being exposed inadvertently. The systems and methods can employ a policy engine for identifying information in a notification and various protection techniques. The policy engine can determine and assign a protection level (sometimes referred to as a risk level) to various notifications, e.g., based on contextual information indicative of whether an authorized user is proximate to the receiving client device, the state of the client device, the content of the notification and so on, which may be indicative of whether a security or privacy issue can arise in allowing part or all of the notification to be rendered. The policy engine may rewrite, remove or modify content or information within the notification, (e.g., according to the assigned protection level) thus eliminating the likelihood of inadvertent disclosure of sensitive information within a notification. The policy engine may use various factors for determining whether to display or render notifications, modify a notification's content, or block a notification all together. Such factors may include, for instance, geographic information (e.g., global positioning system (GPS) or similar data), idle state or other condition of the client device (e.g., including temporal information indicative of prolonged inactivity or separation from an authorized user), use of a reputable Wi-Fi network for communicating the notification, and so forth. Hence, privacy and security is enhanced and improved relative to existing systems (e.g., clients receiving direct notification pushes from notification sources) that do not manage notifications much less employ policy-based contextual considerations for managing notifications.

Figure 2:
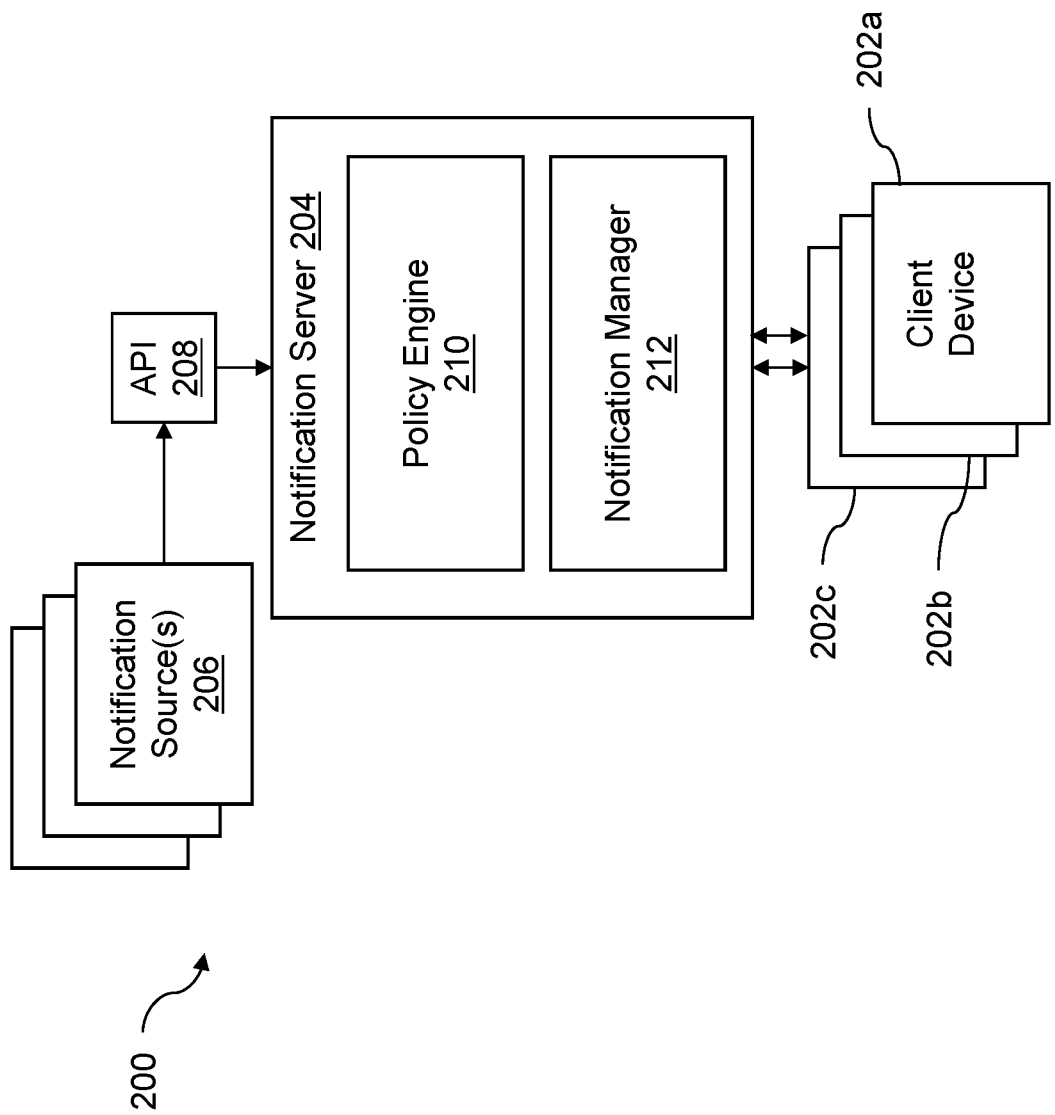
FIG. 2 is a block diagram of an example embodiment of a system for managing delivery of notifications.

Referring now to FIG. 2, depicted is a block diagram of a system 200 for managing notifications, according to an illustrative embodiment. The system 200 is shown to include a plurality of client devices 202, a notification server 204, and a plurality of notification sources 206. The notification sources 206 (e.g., Microsoft® Outlook or other email service, document sharing and storage applications such as Dropbox®, Google Drive®), social media servers/services) may deliver notifications to the notification server 204 (e.g., through at least one API 208). A policy engine 210 of the notification server 204 may be configured to receive information indicative of a physical or geographical proximity between a client device 202 and an authorized user (e.g., owner or assigned user) of the client device 202. The policy engine 210 may be configured to receive additional information that is contextual and associated with the client device (and/or its application(s)), its network and/or the authorized user, such as idle state information corresponding to the client device 202 (or an application executing on the client device 202). Idle state information (sometimes referred to as user activity information or active use information) may be or include information or data corresponding to whether or not a user is using (e.g., actively or otherwise) and/or has used (or not used) the client device 202 (or an application of the client device 202), e.g., in association with any time period, window, frequency and/or activity pattern. The policy engine 210 may be configured to determine a notification protection level based on the information received and/or evaluated by the policy engine 210. The notification protection level may be indicative of risks (e.g., privacy and/or security risks) associated with rendering a notification on a client device, and/or an amount of effort or processing that can or should be applied to address the risks. The notification protection level can for instance be a numerical representation of the proximity of the authorized user to a client device 202, the idle state information corresponding to the client device 202 (or an application executing on the client device 202), and/or the contextual information corresponding to the client device 202, its network, its user and/or its application(s).

A notification manager 212 of the notification server 204 may be configured to receive a notification from one of the notification sources 206 for rendering on (at least) a screen or other interface (e.g., speaker or other output/communication/feedback system) of the client device 202. The notification manager 212 may be configured to allow, modify, or block the received notification according to the determined notification protection level.

The systems and methods of the present solution may be implemented in any type and form of device, including clients, servers and/or appliances described above with reference to FIG. 1. As referenced herein, a "server" may sometimes refer to any device in a client-server relationship, e.g., the notification server 204 in a handshake with the client device(s) 202 and/or the notification source(s) 206.

The client device(s) 202, notification server 204, and/or notification source(s) 206 may include or incorporate components and devices similar in some aspects to those described above with reference to FIG. 1, such as a memory and/or one or more processors operatively coupled to the memory. The present systems and methods may be implemented in any embodiments or aspects of the appliances or devices described herein.

The system 200 is shown to include a plurality of client devices 202 including a first client device 202a, a second client device 202b, a third client device 202c, and so forth (sometimes referred to as client device(s) 202). While three client devices 202a-202c are shown, the system 200 may include any number of client devices 202. Hence, the present disclosure is not limited to the particular arrangement depicted in FIG. 2. The client device(s) 202 may be or include aspects, features, and components similar to the computing device 101 described above. The client device(s) 202 may be or include, for instance, a desktop computer, a laptop computer, a smart phone or mobile device, a tablet, to name a few possibilities. The client device(s) 202 may host, execute, deliver, or otherwise provide applications or resources to a user. For instance, the client device(s) 202 may include a display or screen which renders a user interface including various icons for selecting applications. A user may select an icon and launch the corresponding application (which may be configured to execute on a cloud-based server with the server delivering or streaming content to the client device 202 or the application may be configured to execute natively on the client device 202). In some embodiments, the client device(s) 202 may be configured to render (e.g., display, stream, play, in visible and/or audible form or otherwise) notifications from the various applications and sources (such as notification sources 206) on the screen/interface of the client device 202. In some embodiments, one of the client devices 202 may be different from other client devices 202. For instance, the first client device 202a may be or include a desktop computer, and the second client device 202b may be or include a mobile device. The first and second client devices 202a, 202b may both be associated with or correspond to an authorized user. The client devices 202a-202c may be referred to hereinafter generally as "client device 202" or "client device(s) 202." It should be understood that at least one of the client device(s) 202 may be configured according to the description below. In some implementations, each of the client devices 202 may be configured according to the description below.

The client device(s) 202 may be configured to monitor, evaluate, provide and/or determine various state or condition information (e.g., idle state information) corresponding to the client device(s) 202. One or more monitoring systems, such as or including an agent (e.g., residing or executing on the client device 202) and/or end-point detection system (e.g., residing on server(s) and/or the client device 202) may detect, identify, monitor, track, determine and/or provide any such information. In some embodiments, idle state information (sometimes referred to as user activity information or active use information) may be or include information or data corresponding to whether or not a user is using (e.g., actively or otherwise) and/or has used (or not used) the client device 202 (or an application of the client device 202), e.g., in association with any time period, window, frequency and/or activity pattern. The client device 202 may be configured to identify, determine, generate, etc., the idle state information based on, for instance, an elapsed duration between inputs received from the user, a duration in which the client device 202 is turned off or in "sleep mode," or has not received user input or detected movement, and so forth. The client device 202 may be configured to generate idle state information based on such data corresponding to user inputs to the client device 202, or the user's use or interactions with the client device 202 (or its application(s)). In some embodiments, the client devices 202 may be configured to perform various functions responsive to generation of the idle state information.

Idle state information may be indicative of the client device 202 being in an idle state (e.g., an extended duration of non-use), or that the client device 202 has (e.g., automatically) turn off or darken the screen of the client device 202. While described above as the client device 202 being in an idle state (e.g., low power, power-saving or sleep mode), in some embodiments, the client device 202 in such a state may be configured to detect an idle state of an application executing on the client device 202.

In some embodiments, the client device 202 may be configured to monitor contextual information of the client device 202. "Contextual information," as used herein, can refer to data corresponding to a condition, state, operation mode and/or status of the client device 202 and/or an application which is accessed via the client device 202. As some non-limiting examples, the client device 202 may be configured to monitor a duration of the client device 202 being in a stationary/static state (e.g., based on GPS data remaining unchanged, gyroscope sensors showing limited to no movement), duration of the screen being in a darkened or low-power state, duration of the client device 202 being in a locked state (e.g., calculating how long the device screen is darkened or in a low-power state or locked, using a clock/timer), whether the screen is covered by an accessory cover (e.g., using one or more camera sensors or ranging sensors positioned in or near the client device 202), duration since the client device 202 was last unlocked (e.g., using a clock/timer), battery level of the client device 202 (e.g., remaining battery, percentage full/depleted, or estimated remaining duration of operation), reputation of the application (e.g., according to a rating from an application store, from internet reviews, and so forth), category of the application (e.g., based on data from an application store, its developer, its features, or internet reviews), time or day of the notification (e.g., whether the notification is received when the application or client device 202 is in use, during business hours or otherwise, according to data from a user's calendar, etc.), positioning-related information of the client device 202 (e.g., from GPS data or Wi-Fi positioning), whether the client device 202 is in a trusted zone (e.g., based on the location of the client device 202, a network connection for the client device 202, a GeoFence, and so forth), or a Wi-Fi network of the client device 202 (e.g., based on the Wi-Fi name and type, Wi-Fi reputation, Wi-Fi signal strength, Wi-Fi encryption level, Wi-Fi authentication method, Wi-Fi related security settings, etc.). The client device 202 may be configured to generate data corresponding to such monitored conditions, states, operating modes and statuses, which may be or correspond to the contextual information. Contextual information can include miscellaneous or supporting information that can be independent of or related to idle state information for instance. As an example, contextual information (e.g., the "duration" of being in low power mode) can supplement idle state information (e.g., being in low power mode).

The client device(s) 202 and/or the monitoring system(s) may be configured to deliver various information and data to the notification server 204. The client device(s) 202 and/or the monitoring system(s) may be configured to deliver, for instance, the idle state information and contextual information to the notification server 204. The client device(s) 202, the monitoring system(s) and/or notification server 204 may be communicably coupled to one another such that they can transmit and/or receive information amongst one another. The client device(s) 202, the monitoring system(s) and/or notification server may be communicably coupled to one another via a network. In some embodiments, the network may be a local area network (LAN), wide area network (WAN), wireless local area network (WLAN), virtual private network (VPN), etc. The client device(s) 202, the monitoring system(s) and/or notification server 204 may be configured to exchange data with one another across such a network.

The notification server 204 may be configured to receive data and information (e.g., contextual information, idle state information) from various sources and locations. The notification server 204 may be configured to receive data from the monitoring system(s), the client device(s) 202 and/or from the notification source(s) 206. The notification server 204 may be configured to intercept, detect, receive, convey, route, process and/or manage notifications from the notification source(s) 206, and the notification server 204 may be configured to receive various information (such as idle state information, contextual information, etc.) from the monitoring system(s) and/or the client device(s) 202. The notification server 204 may be configured to use such information to detect, identify, compute, calculate, or otherwise determine a notification protection level based on, at least, the information from the monitoring system(s) and/or the client device(s) 202. The notification server 204 may be configured to selectively allow, modify, or block notifications from the notification source(s) 206 based on the determined notification protection level, as described in greater detail below.

The notification server 204 is shown to include a policy engine 210 by way of example, although the policy engine 210 may be external to the notification server 204 in some embodiments for instance. The policy engine 210 may be any device(s) or component(s) designed or implemented to apply at least one policy to data and information received from various sources. Generally speaking, the policy engine 210 may be configured to receive information indicative of a proximity between a client device 202 and an authorized user of the client device 202. The policy engine 210 may be configured to receive idle state information corresponding to the client device 202 and/or an application executing on the client device 202.

The policy engine 210 may be configured to determine a notification protection level using such information. While shown as embodied on the notification server 204, in some implementations, the policy engine 210 (and/or the notification manager 212) may be communicably coupled to the notification server 204, remotely accessible by the notification server 204, etc. Hence, the present disclosure is not limited to the particular arrangement shown in FIG. 2.

The policy engine 210 may be configured to identify, retrieve, collect, access, aggregate or otherwise receive information corresponding to or indicative of a proximity between a client device 202 and an authorized user of the client device 202. The authorized user may be a user who can be logged (e.g., successfully) onto the client device 202, a user who is registered with and/or owns the client device 202, a user who has permission to permanently or temporarily use the device 202, and so forth. The policy engine 210 may be configured to receive information indicative of the proximity between the client device 202 and authorized user, by identifying a location of the client device 202 and identifying or estimating a location of the authorized user.

The policy engine 210 and/or a monitoring system may be configured to identify or determine the location of the client device 202. The policy engine 210 and/or a monitoring system may be configured to identify the location of the client device 202 by receiving GPS or other location data (e.g., network connection data, such as IP address, Wi-Fi network info and/or port connection info) corresponding to the client device 202. In some embodiments, the client device 202 and/or a monitoring system may deliver the GPS/location data to the policy engine 210 in various intervals, dynamically or when the location of the client device 202 changes, continuously (or near continuously), etc. The policy engine 210 may be configured to determine the location of the client device 202 based on the location data received from the client device 202. In some embodiments, the policy engine 210 may be configured to determine the location of the client device 202 based on the location of an access point via which the client device 202 accesses a network. Where the client device 202 accesses a network, the client device 202 may use or form a connection with an access point, which may be used for identifying a position of the client device 202 (e.g., based on which network device the client device 202 connects to, through handshake data during initial access negotiation, physical port connection, Wi-Fi hotspot connection, and so forth).

The policy engine 210 may be configured to identify, determine, retrieve, or otherwise receive information or data corresponding to a location of the authorized user. The policy engine 210 and/or a monitoring system may be configured to estimate the authorized user's location in a number of ways. As one non-limiting example, the policy engine 210 may be configured to receive information or data corresponding to a local area network (LAN), enterprise private network (EPN), or other enterprise network which the user may access (e.g., using another client device). The policy engine 210 may be configured to identify a source network internet protocol (IP) address (e.g., associated with a device in use by the authorized user). The policy engine 210 and/or the monitoring system may be configured to determine whether the user is located within the enterprise based on whether an IP address for the device in use by the user is accessing the enterprise network. As another example, the policy engine 210 may be configured to determine which of several possible client devices 202 the user is accessing by receiving data corresponding to an indication of the client device 202 that the user is currently or most-recently accessing. For instance, where the user logs into a first client device 202a and, subsequently, logs into a second client device 202b or endpoint device (different from the first client device 202a), the policy engine 210 may be configured to determine (e.g., via an IP address of the most recent login from the second client device 202b, which is different from an IP address of the earlier login from the first client device 202a) that the user is no longer located near the first client device 202a. As yet another example, where the user accesses (e.g., on a client device 202) a mobile application associated with and/or managed by the enterprise, the policy server 210 and/or the monitoring system may be configured to generate a prompt (e.g. a request directed or transmitted to a known IP address of the client device 202, to request for a response providing a GPS location of the client device 202) which causes the client device 202 which the user is accessing to transmit a current location of the client device 202. As still another example, where the user accesses a virtualized application or desktop, the user may make the request, register, authenticate and/or sign in at a network/IP address (such as ab address of a personal computer, tablet, thin client, and so forth) indicative of the user's location. The user's location may be identified when the user reports, checks-in, signs-in, registers, authenticates, make a transaction/payment, and so on, at a device (e.g., security gateway or entryway, transaction terminal, networked node). Hence, the policy engine 210 may obtain location information of the user even where the user accesses a virtualized application or desktop e.g., using a device other than the first client device 202a. While these examples are provided, it should be understood that the present disclosure is not limited to these particular examples. A person's location may be identified or inferred through any number of different methods, manners, means, etc. Hence, the examples provided above are merely illustrative in nature.

The policy engine 210 may be configured to determine a proximity of the client device 202 and the authorized user of the client device 202. The policy engine 210 may be configured to compare the determined location of a first client device 202a (e.g., based on the location data from the client device 202a, data corresponding to an access point for the client device 202a) to the estimated, identified, inferred, etc., location of the authorized user (for instance, based on the determined location of a second client device 202b, which may be a mobile device of the authorized user)). The policy engine 210 may be configured to determine whether the authorized user is in possession, in close proximity, near, in the same room, etc., as the client device 202a (for receiving a notification) based on the comparison and relative locations. For instance, the policy engine 210 may compare the locations or relative locations with site maps and/or predetermined separation/distance threshold(s) (e.g., that are indicative of the user being in possession, or in the same room, etc.). Such thresholds can be set at specific distances (e.g., 1 meter, 5 meters, and so on). The locations of the user (based on the location of the second client device 202b) and the client device 202a can be mapped or translated onto locations within a site map, and compared with boundaries of rooms or partitions described in the site map.

The policy engine 210 may be configured to receive data and/or information corresponding to an idle state of the client device 202a and/or an application executing on the client device 202a. An idle state can be indicative of the activity level and/or idleness of the client device 202a (or its application), and can be a value (e.g., a numerical value, ranging From 1 to 10 for instance) or a state, condition or mode (e.g., low power or power-saving mode, active or awake mode). As described above, the client device 202a (e.g., assigned to or otherwise associated with the authorized user) and/or a monitoring system may determine, communicate, deliver, provide or otherwise transmit idle state information to the notification server 204 (e.g., via the network connecting the client device 202a, monitoring system and/or notification server 204). The notification server 204 may be configured to receive the idle state information from the client device 202 and/or the monitoring system. In some examples, the idle state information may indicate that the client device 202a (or application executing on the client device 202a) is idle (e.g., not actively being used by a user, or in locked state, low/reduced power state, or in sleep mode). In some examples, the idle state information received from the client device 202a may indicate that the client device 202a (or application executing on the client device 202a) are being actively or recently used, controlled, operated, etc., by the user, or otherwise.

The policy engine 210 may be configured to receive contextual information corresponding to the client device 202a. Similar to the idle state information, the client device 202a and/or the monitoring system may be configured to transmit the contextual information to the notification sever 204 via the network which connects the client device 202a, the monitoring system and/or notification server 204. The notification server 204 may receive the contextual information in any form or manner, e.g., periodically, responsive to sending a request for the information, continuously, or dynamically as new/update information is available.

The policy engine 210 may be configured to calculate, compute, identify, generate, or otherwise determine a notification protection level. The notification protection level may correspond to, or be generated for the client device 202a which transmits the idle state information. Where a particular user is an authorized user for a plurality of client devices (e.g., client device 202a, client device 202b, client device 202c, and so forth), the policy engine 210 may be configured to determine a notification protection level for each of the client devices 202.

The policy engine 210 may be configured to determine the notification protection level by performing an operation or applying a function on, for instance, 1) the proximity information corresponding to the relative distance of the authorized user and client device 202a (e.g., a numerical value of the relative distance), and 2) the idle state information and/or contextual information (e.g., in numerical representations or otherwise). The policy engine 210 may compute numerical representations of the idle state information and/or contextual information by assigning an integer (or other number or value) to particular responses or information from the idle state information or contextual information. In some embodiments, the policy engine 210 may be configured to weigh (e.g., apply a weight to) some information differently from other information. For instance, some contextual information may be weighted differently than other contextual information according to the relative importance or relevance of various information. As another example, the idle state information may be weighted differently than one or more types of contextual information. The policy engine 210 may be configured to perform an operation (such as adding, multiplying, dividing, etc.) or mathematical function on the relative distance and numerical representations of the idle state information and/or contextual information. It is noted that the policy engine 210 can apply any combinations and sub-combinations of operations, weighting, numerical representation calculations, etc. on the proximity information, the idle state information and/or one or more types of contextual information, to determine a notification protection level based on the proximity information, idle state information, and/or the contextual information. The policy engine 210 may determine the notification protection level by assigning or determining numerical values to the different types of information (which may be weighted differently), and performing an operation or function on those numerical values to compute the notification protection level. Thus, the notification protection level may be a numerical representation of the proximity of the authorized user to a respective client device 202, the idle state information corresponding to the client device 202 (or an application executing on the client device 202), and/or the contextual information corresponding to the client device 202, its network, its user and/or its application(s).

The policy engine 210 may be configured to maintain, include, store, access, or otherwise use thresholds. The thresholds may be compared against the notification protection level to determine whether to allow, modify or block a corresponding notification to a respective client device 202. In some embodiments, the policy engine 210 may include or access any number of thresholds. Each of the thresholds may correspond to a particular action to perform on incoming notifications destined for a particular client device 202. For instance, the policy engine 210 may be configured to store or access a first threshold and a second threshold. The first threshold may be a threshold which separates instances where a notification is delivered in full to the client device 202 and instances where a notification is modified prior to delivery to the client device 202. The second threshold, in some examples, may be a threshold which separates instances where a notification is modified prior to delivery to the client device 202 and instances where a notification is blocked from delivery to the client device 202. The policy engine 210 may be configured to compare the notification protection level for a client device 202 to the first threshold and second threshold (or ranges defined by the thresholds). As described in greater detail below, the notification manager 212 may be configured to selectively allow, modify, or block notifications (e.g., received or intercepted from notification source(s) 206) based on such comparison by the policy engine 210.

The notification source(s) 206 may be any devices, components, servers, programs, resources, applications, and so forth configured to generate notifications for a client device 202.

The notification source(s) 206 may include any application or resource which generates data (including notifications) remotely and delivers such data to the client device 202. In some embodiments, the notification source(s) 206 may be or include a Software-as-a-Service (SaaS) application, a virtual desktop, a virtual application, etc. Various non-limiting examples of such notification source(s) 206 can include, for instance, servers in communication with mobile device applications available on an application store, Microsoft® Outlook or other email service, document sharing and storage applications (such as Dropbox®, Google Drive®), social media servers/services and so forth. Each of such notification source(s) 206 may be designed or implemented to generate notifications (e.g., updates, alerts, reminders, unicasts, broadcasts), and transmit those notifications to the client devices 202.

In some embodiments, the notification source(s) 206 may be configured to deliver the notifications to the client devices 202 through the notification server 204. Hence, the notification source(s) 206 may direct, transmit or route notifications destined for a client device 202 to the notification server 204, and the notification server 204 may selectively route those notifications to the client device 202, as described in greater detail herein.

The notification source(s) 206 may be configured to communicate the notifications to the notification server 204 via one or more application program interfaces (APIs) 208. The API 208 may be any device(s) or component(s) configured to define a language, protocol or format of data between elements. The API 208 may be configured to define a language, protocol or format of data between the notification source(s) 206 and the client device(s) 202 (or particular application(s) operating on the client device(s)). In some embodiments, the system 200 may include a plurality of APIs 208 which are structured according to, for instance, the type of client device 202, the operating system and/or application(s) executing on the client device(s) 202, and so forth. As two non-limiting examples, the system 200 may include Apple Push Notification Service (APNS) for client device(s) 202 which uses the iOS operating system, and Google Cloud Messaging (GCM) for client device(s) 202 which uses an Android® operating system. The APIs 208 may define, at least, the structure of notifications delivered from the notification source(s) 206 to the client device(s) 202 (and routed through the notification server 204). The APIs 208 may push, route or deliver notifications (and/or other data) to the notification server 204 (or that are intercepted by the notification server 204) for delivery to the client device(s) 202.

The notification server 204 is shown to include a notification manager 212 in FIG. 2 for instance. In some embodiments, the notification manager 212 may be part of or combined with the policy engine 210. The notification manager 212 may be designed or implemented to receive notification(s) from the notification source(s) 206 and can perform one or more actions on the notifications based on, for instance, the notification protection level. The notification manager 212 may be configured to allow the notification to be delivered to the client device 202, modify the notification and deliver the modified notification to the client device 202, and/or block the notification from being delivered to the client device 202.

The notification manager 212 of the notification server 204 may be configured to receive notifications from the notification source(s) 206. The notification manager 212 may be configured to receive the notifications prior to transmission, routing, and/or delivery of the notifications to the intended client device 202. In some embodiments, the notification manager 212 may be configured to intercept notifications from the notification source(s) 206. In some embodiments, the notification manager 212 may be configured to receive notifications via the API 208 from the notification source(s) 206. In such embodiments, the notification source(s) 206 may deliver the notifications (which are received by the notification manager 212) to the intended client device 202 via a corresponding API 208 through the notification server 204.

The notification manager 212 may retrieve, receive, or otherwise identify the notification protection level from the policy engine 210 for the particular client device 202 responsive to receiving the notification destined for the particular client device 202. The notification manager 212 may request and/or receive instructions and/or a notification protection level from the policy engine 210 to manage (e.g., allow, modify or block) a corresponding notification destined for the particular client device 202, responsive to receiving the notification. In some embodiments, the policy engine 210 may be configured to receive the proximity information, idle state information, and/or contextual information responsive to the notification manager 212 receiving the notification. In some embodiments, the policy engine 210 may be configured to compute the notification protection level responsive to the notification manager 212 receiving the notification.

The notification manager 212 may be designed or implemented to perform one or more actions on the notifications received from the notification source(s) 206 which are destined for a particular client device 202. The notification manager 212 may be configured to perform the one or more actions based on the notification protection level from the policy engine 210, or based on instructions determined by the policy engine 210 according to the notification protection level. In some embodiments, the notification manager 212 may be configured to perform one or more actions based on the comparison of the notification protection level to the various threshold(s) by the policy engine 210. As such, the notification manager 212 may perform various actions on the received notification according to the determined notification protection level from the policy engine 210.

The notification manager 212 may be configured to perform various actions on the received notification including, but not limited to, allowing the notification to be delivered to the intended client device 202 (e.g., without any change to the content of the notification), modifying the notification (e.g., modification of the content and/or formatting) and delivering the notification to the client device 202, and/or blocking the notification (e.g., from being delivered to the intended client device 202, or by turning off the notification feature on the client device 202). The notification manager 212 may be configured to perform such actions based on the notification protection level.

In some embodiments, the notification manager 212 may be configured to allow the notification to be delivered to the intended client device 202. The notification manager 212 may be configured to allow the notification to be delivered to the intended client device 202 when the notification protection level is determined based on the scenario that the authorized user is, for instance, near the client device 202, the client device 202 is in a safe location, the client device 202 is not idle (or has not been idle for an extended period), and so forth. The notification manager 212 may be configured to allow the notification to be delivered to the intended client device 202 based on the comparison of the notification protection level to the first threshold (described above). For instance, where the notification protection level is less than the first threshold, the notification manager 212 may be configured to allow the notification to be delivered to the intended client device 202. The notification manger 212 may push the notification to the client device 202 for rendering, and the client device 202 may receive and render the notification.

In some embodiments, the notification manager 212 may be configured to modify a notification to be delivered to the intended client device 202. The notification manager 212 may retain or include information or data corresponding to the structure of various notification data transmitted from the notification source(s) 206. Such information may be accessible by the notification manager 212 via the APIs 208. The notification manager 212 may be configured to determine whether a notification is modifiable based on whether the notification manager includes or has access to the structure or format of the notification data. The notification manager 212 may be configured to modify some notifications (where possible), as described in greater detail below. Where the notification manager is not capable of modifying a notification, the notification manager 212 may be configured to, for instance, block the notification from being sent to the client, allow the notification but communicate a signal to the client device 202 to disable a notification preview feature on the client device 202 (so that the notification is not rendered/displayed on the client device 202), and so forth.

The notification manager 212 may be configured to determine whether to modify the notification. The notification manager 212 may be configured to determine whether to modify the notification based on the notification protection level. The notification manager 212 may be configured to modify the notification when the notification protection level is determined based on the scenario that the authorized user is, for instance, near the client device 202 but in a public location or other area where sensitive information should not be displayed or rendered on the client device. The notification manager 212 may be configured to modify the notification based on the comparison of the notification protection level to the first and second threshold (described above). For instance, the notification manager 212 may be configured to modify the notification when the notification protection level is, for instance, between the first and second thresholds.

The notification manager 212 may be configured to modify the notification by manipulating, modifying, replacing, removing, obfuscating, altering, randomizing, translating or otherwise changing at least a portion of the notification data received from the notification source(s) 206. In some embodiments, the notification manager 212 may be configured to encode at least some of the notification data. The notification manager 212 may be designed or implemented to change the notification data corresponding to the content of the notification. For instance, the notification manager 212 may be configured to modify the notification data to remove the content (e.g., sensitive information, such as personally identifiable data, meeting times and locations, confidential information) from the notification (while maintaining certain identification information, such as an identification of the source, a time of the notification, and so forth). The notification manager 212 may be configured to modify the notification data to obfuscate the content of the notification. The notification manager 212 may modify the notification data to encrypt, secure, render unreadable, or otherwise encode the content of the notification. The notification manager 212 may modify the formatting of the notification data, e.g., to minimize or otherwise change the font of text, change the color and/or transparency of the text, to increase difficulty in reading the content by an unintended recipient. In each of these embodiments, the notification manager 212 may be configured to modify or change one or more aspects of the notification (and/or to various extent of modification) based on the notification protection level (e.g., according to predetermined ranges for the value of the notification protection level). For example, the higher the value of the notification protection level, the larger is the extent of the modification being applied, and/or the number of aspects of the notification being modified. Such embodiments may secure the content of the notification, thus lessening the likelihood of interception and furthering DLP motivations.

The notification manager 212 may be configured to block the notification received from the notification source(s) 206. The notification manager 212 may be configured to block the notification received from the notification source(s) 206 to the intended client device 202. In some embodiments, the notification manager 212 may intercept the notification and prevent the notification from delivery to the client device 202. The notification manager 212 may be configured to block the received notification when the notification protection level is determined based on the scenario that the client device 202 has for instance been idle for an extended period of time, the authorized user is not near the client device 202, the client device 202 is in an unsecure location, and so forth. The notification manager 212 may block the notification based on the comparison of the notification protection level to the second threshold (described above). For instance, the notification manager 212 may be configured to modify the notification when the notification protection level is, for instance, greater than the second threshold.

In some embodiments, the notification manager 212 may be configured to generate a signal for transmission to the client device 202 which is to receive the notification. The signal may be a signal which, when received by the client device 202, causes the client device 202 to modify one or more settings of the client device 202. The settings may be or include, for instance, settings corresponding to a feature for previewing, displaying or rendering message content in a notification. The notification manager 212 may be configured to generate the signal for transmission to the client device 202 rather than (or in conjunction with) blocking the notification from being sent to the client device 202. For instance, the notification manager 212 may be configured to generate the signal when the notification protection level is determined based on the scenario that the client device 202 has for instance been idle for an extended period of time, the authorized user is not near the client device 202, the client device 202 is in an unsecure location, and so forth. The notification manager 212 may generate the signal based on the comparison of the notification protection level to the second threshold (described above) for instance. For instance, the notification manager 212 may generate the signal when the notification protection level is, for instance, greater than the second threshold. In each of these embodiments, the signal may disable the feature of the client device 202 for previewing/displaying/rendering the message content of the notification. In such embodiments, the notification may (or may not) still be delivered to the client device 202. However, the content of the notification would not be rendered on the screen of the client device 202.

As notifications are received for each of the client device(s) 202, the policy engine 210 and notification manager 212 may determine the notification protection level and selectively allow, modify or block the received notification(s) according to a notification protection level determined for the corresponding client devices 202. In some embodiments, a given notification may be intended for several client devices 202. In such embodiments, the policy engine 210 and may be configured to determine the notification protection level for each of the client devices 202, and the notification manager 212 may be configured to selectively allow, modify or block the received notification(s) according to the notification protection level determined for each of the corresponding client devices 202. As such, notifications may be allowed, modified, or blocked on a client device-by-client device basis according to the notification protection level determined for each of the client devices 202.

It is noted that the present systems may be adapted, modified, configured, etc. to perform various other functions and include other features. For instance, the notification server may be implemented in a cloud environment (such as Citrix Cloud) such that local devices (e.g., the client devices 202, APIs 208, notification source(s) 206, etc.), may not be changed to support certain features discussed herein. Rather, the notification server implemented in a cloud-based environment may manage local devices and/or local applications (and any other applications which may be managed by the cloud environment). Hence, the notification server may provide a notification push management service. In such embodiments, the cloud-based server may receive the information from or corresponding to the client device 202 (e.g., the proximity information, idle state information, contextual information, etc.). The cloud-based server may push the full notification, modified notification, or block the notification to the client device 202 according to the notification protection level, as described above.

Such information notification protection levels may be used in other environments and contexts. For instance, the notification protection levels may be used by an analytics service (such as Citrix Analytics Service (CAS)). The analytics service may receive the notification protection levels as a report for different applications and how the notification protection level is calculated/executed in various client devices and in various contextual situations. Such information may be very helpful in understanding how notification privacy is protected and secured from the perspective of big data. Also, by incorporating relative locations of a client device and an authorized user into the calculus, users may be informed on how to better protect privacy and data, which may increase user behavior and traits over time.

In some embodiments, the notification server 204 may be deployed and managed in an environment, such as the Citrix Software Defined Perimeter (SDP). In such embodiments, the policy may be unified and replicated to various devices and applications. Based on the context that client devices 202 and applications are involved, the policy engine 210 may individually apply the policies described herein to operate in various scenarios and conditions.

Lastly, the embodiments described herein, such as the notification server 204, may be incorporated into various mobile interface managers such as Citrix's Endpoint Management. Further, certain functionalities of the notification server 204 (e.g., the policy engine 210 and notification manager 212) may be moved into, built into, execute within, or otherwise incorporated into the client device 202 or an application of the client device 202, to achieve similar or the same results, and is within the contemplation of this disclosure.

Figure 3:
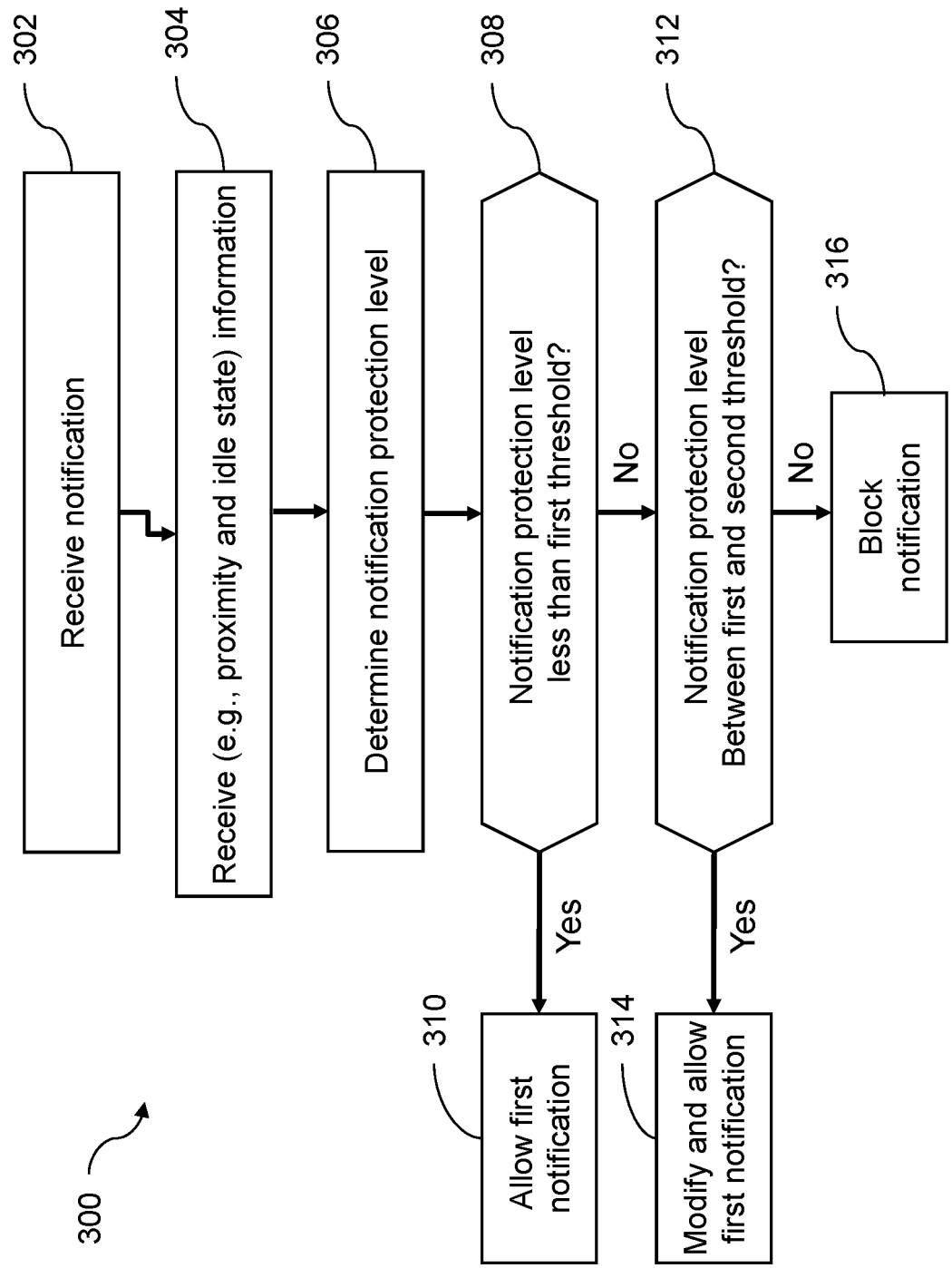
FIG. 3 is a flow diagram for a method for managing delivery of notifications.

Referring now to FIG. 3, depicted is a flow diagram for a method 300 for managing notifications. The functionalities of method 300 may be implemented using, or performed by, the components described in FIGS. 1-2, such as the client device(s) 202, the notification server 204, etc. In brief overview, a notification server (sometimes referred as a server or computing device) receives a notification (302). The notification server receives first (e.g., proximity) information and second (e.g., idle state) information (304), e.g., from at least one client device 202 and/or at least one monitoring system. The notification server determines a notification protection level (306). The notification server determines whether the notification protection level is less than a first threshold (308). Where the notification protection level is less than the first threshold, the notification server allows the notification (310). Where the notification protection level is greater than the first threshold, the notification server determines whether the notification protection level is between the first threshold and a second threshold (312). Where the notification protection level is between the first and second threshold, the notification server modifies and allows the notification (314). Where the notification protection level is not between the first and second threshold, the notification server blocks the notification (316).

At operation (302), and in some embodiments, a notification server receives a notification. In some embodiments, the notification server receives or intercepts a notification (and/or other notification(s)) from at least one notification source. The notification server may be in communication with a client device and the at least one notification source. The notification may be for rendering on at least a screen of the client device. The notification may be a push notification from the notification source. In some embodiments, the notification may be pushed from the notification source to the notification server as the notification is generated by the source (e.g., based on a trigger event). In some embodiments, the notification may be pushed to the notification server at a scheduled time. In each of the embodiments, the notification server may receive the notification. In some embodiments, the notifications may include sensitive information (such as confidential, enterprise, personally identifiable, private, etc., information). As such, it may be desirable to protect the information contained in the notifications from unintended persons that can intercept the information from the client device or prior to being received by the client device (e.g., via an insufficiently secured Wi-Fi network of the client device).

In some embodiments, the at least one notification source includes a SaaS application, a virtual desktop, or a virtual application (e.g., the hosting or provisioning server of such an application). Various non-limiting examples of such notification source(s) include, for instance, server(s) in communication with mobile device applications available on an application store, Microsoft® Outlook or other email service, document sharing and storage applications or services (such as Dropbox®), and so forth. Each of such notification source(s) may generate notifications, and transmit those notifications to the client devices (e.g., through the notification server). The notification server may intercept or receive the notifications from the notification sources.

At operation (304), the notification server receives first (e.g., proximity or other) information and second (e.g., idle state or other) information. In some embodiments, the notification server may receive first information (or proximity information) indicative of a distance, physical or spatial separation, or proximity between the client device and a user (e.g., an authorized user) of the client device, which can be measured or provided using any distance unit (e.g., meter, feet, yard). The notification server may receive second information comprising idle state information of the client device (e.g., idle state information of at least one of 1) the client device or 2) an application executing on the client device). Hence, the notification server may receive proximity information and/or idle state information. In some embodiments, the first information and/or the second information can be any other type of information (e.g., contextual information). The first information and the second information can be different types of information. The notification server may use the contextual information, proximity information, the idle state information, and/or other type of information, to determine a notification protection level, as described illustratively below.

The notification server may identify the proximity between the client device and authorized user by identifying a location of the client device and identifying or estimating a location of the authorized user. For instance, the notification server may determine the location of the client device. The notification server may determine the location of the client device based on GPS or other positioning data (e.g., based on Wi-Fi network or cellular-based triangulation or positioning) of the client device which is then communicated by the client device or a monitoring system (e.g., at intervals, on demand, continuously or near-continuously, and so forth) to the notification server. The notification server may determine the location of the client device based on an access point for the client device when the client device accesses a network.

The notification server may determine or estimate the location of the authorized user corresponding to the client device. The notification server may receive various information corresponding to the location of the authorized user. As one non-limiting example, the notification server may receive information or data corresponding to a LAN, enterprise private network (EPN), or other enterprise network accessed by the user may with a client device other than the client device assigned to the user. The notification server may identify a source network internet protocol (IP) address accessed or used by the user with the other client device. The notification server may determine whether the user is located based on whether an IP address for the other client device being used by the user to access the enterprise network. As another example, the notification server may determine which client device the user is currently accessing. For instance, where the user logs into a first client device and, subsequently, logs into a second or different client device or endpoint device, the notification server may determine (e.g., via a change in the IP or network address from which the logins occur) that the user is no longer located near the first client device. As yet another example, where the user accesses (e.g., on a client device) a mobile application associated with and/or managed by the enterprise, the notification server may generate a prompt which causes the client device to transmit a current location for the other client device which the user is using. As still another example, where the user accesses a virtualized application or desktop, the notification server may access a network address (such as an address of a personal computer, tablet, thin client, and so forth) from which the user is accessing the virtualized application or desktop. Hence, the notification server may determine a location of the user.

The notification server may determine a proximity of the client device and the authorized user of the client device. The notification server may compare the determined location of the client device (e.g., based on the location data from the client device, data corresponding to an access point for the client device) to the estimated, identified, inferred, etc., location of the authorized user (e.g., based on the information described above). The notification server may determine whether the authorized user is in possession, in close proximity, near, in the same room, etc., as the client device based on the comparison and the relative locations. For instance, the notification server may compare the locations or relative locations with site maps and/or predetermined separation/distance threshold(s) (e.g., that are indicative of the user being in possession, or in the same room, etc.). Such thresholds can be set at specific distances (e.g., 1 meter, 5 meters, and so on) for determining that the user is in possession of the client device for instance. The locations of the user and the client device 202 can be mapped or translated onto locations within a site map, and compared with boundaries of rooms or partitions described in the site map.

The client device(s) 202 may monitor, evaluate, and/or determine various idle state information corresponding to the client device(s) and/or their application(s). In some embodiments, the idle state information may be or include information or data corresponding to whether a user is currently using, or has used the client device (or an application of the client device), e.g., recently or within a certain time window. The client device may identify, determine, generate, etc., the idle state information based on, for instance, an elapsed duration between inputs received from the user, a duration in which the client device is turned off or in "sleep mode," and so forth. The client device may generate idle state information based on such data corresponding to user inputs to or other interactions with the client device. In some embodiments, the client devices may perform various functions responsive to generation of the idle state information. For instance, where a client device generates idle state information indicative of the client device being in an idle state (e.g., an extended duration of non-use), the client device may automatically turn off or darken the screen of the client device. While described above as the client device being in an idle state, in some embodiments, the client device may detect an idle state of an application accessible to the user via the client device.

In some embodiments, the client device may monitor contextual information about the client device and/or application. As some non-limiting examples, the client device may monitor a duration of the client device being in a stationary/static state (e.g., based on GPS data remaining still, gyroscope sensors showing limited to no movement), duration of the screen being in a darkened or low-power state, duration of the client device being in a locked state (e.g., calculating how long the device screen is darkened or in a low-power state or locked, using a clock/timer), whether the screen is covered by an accessory cover (e.g., based on one or more camera sensors or ranging sensors positioned in or near the client device), duration since the client device was last unlocked (e.g., using a clock/timer to track), battery level of the client device (e.g., remaining battery by percentage, or remaining duration of use), reputation of the application (e.g., according to a rating from an application store, from internet reviews, and so forth), category of the application (e.g., based on data from an application store, features/functionalities of the application), time or day of the notification (e.g., if it is when the application or client device is in use, if it is during business hours or not, based on data from a user's calendar, etc.), positioning-related information of the client device (e.g., from GPS data), whether the client device is in a trusted zone (e.g., based on the location of the client device, a network connection for the client device, a GeoFence, and so forth), or a Wi-Fi network of the client device (e.g., based on the Wi-Fi name and type, Wi-Fi reputation, Wi-Fi signal strength, Wi-Fi encryption level, Wi-Fi authentication method, Wi-Fi related security settings, etc.). The client device may generate data corresponding to such monitored conditions and statuses, which may be or correspond to the contextual information.

The client device(s) may deliver various types of information and data to the notification server 204. The client device(s) may deliver, for instance, the idle state information and/or contextual information to the notification server. Thus, the notification server may receive the first information (e.g., information corresponding to the proximity of the client device to an authorized user of the client device) and second information (e.g., idle state information corresponding to the client device and/or an application of the client device). In some embodiments, the notification server may receive the third information (e.g., the contextual information about the client device and/or application).

At operation (306), the notification server determines a notification protection level. In some embodiments, the notification server may determine the notification protection level using the first information and the second information (e.g., received at operation (304)). The notification server may determine the notification protection level by assigning, computing, or otherwise determining a numerical value or representation of the first and second information.

The notification server may apply one or more weights to the various information in calculating and/or combining the various information to produce the notification protection level. The notification server may perform a mathematical operation or apply a function on numerical values assigned to the first and second information. For instance, the notification server may multiply the numerical value representing the first information and the numerical value representing the second information, to produce the notification protection level.

In some embodiments, the notification server may determine the notification protection level using the first information, second information, and/or third information (e.g., the contextual information about at least one of the client device or the application). In such embodiments, the notification server may assign a numerical value to the third information (including, optionally, weighting various components or subsets of information included in the contextual information). The notification server may compute the notification protection level by performing a mathematical operation or function on the numerical values assigned to the first, second, and/or third information. For example, the notification protection level may be calculated by multiplying the numeral values of the first, second, and/or third information together, or adding these numerical values with predefined weights applied.

In some embodiments, the notification server may receive the first, second and/or third information, and/or determine the notification protection level, responsive to receiving the notification. In such embodiments, operations (304) and (306) may for instance be performed responsive to operation (302). Hence, the notification protection level may be determined on an on-demand basis. In some embodiments, the notification server may receive the first information and/or determine the notification protection level on a rolling basis, independent of when the notification. In such embodiments, operations (304) and (306) may be performed prior to and/or concurrently with operation (306) for example.

At operation (308), the notification server determines whether the notification protection level is less than a first threshold. In some embodiments, to manage delivery of the notification, the notification server may compare the notification protection level with a threshold (e.g., the first and/or second threshold). The notification server may store or otherwise access a threshold (e.g., a threshold determined or predefined based on a desired privacy or protection level on notifications). The threshold may be indicative of or correspond to a notification protection level where the notification server allows or modifies a notification. The threshold may separate instances where the notification protection level indicates that the authorized user is, for instance, near the client device, the client device is in a safe location, the client device is not idle (or has not been idle for an extended period), and so forth, from instances where the notification protection level indicates that the authorized user is, for instance, near the client device but in a public location or other area where sensitive information should not be provided to the user. The threshold may be indicative or correspond to a notification protection level where the notification server modifies or blocks a notification. The threshold may separate instances where the notification protection level indicates that the authorized user is, for instance, near the client device but in a public location or other area where sensitive information should not be provided to the user, from instances where the notification protection level indicates the client device has been idle for an extended period of time, the authorized user is not near the client device, the client device is in an unsecure location, and so forth. In some embodiments, the notification server may include, store, or otherwise access two thresholds (e.g., a first threshold indicative of or corresponding to a notification protection level where the notification server allows or modifies a notification, and a second threshold indicative or corresponding to a notification protection level where the notification server modifies or blocks a notification).

At operation (310), and in some embodiments, the notification server allows the notification. In some embodiments, the notification server allows the received notification (e.g., to be passed to and/or rendered on the client device) according to the determined notification protection level. In some embodiments, the notification manager 212 may be configured to allow the notification to be delivered to the intended client device 202. The notification manager 212 may be configured to allow the notification to be delivered to the intended client device 202 when the notification protection level indicates that the authorized user is, for instance, near the client device 202, the client device 202 is in a safe location, the client device 202 is not idle (or has not been idle for an extended period), and so forth. The notification manager 212 may allow the notification to be delivered to the intended client device 202 based on the comparison of the notification protection level to the first threshold (e.g., described above). For instance, where the notification protection level is less than the first threshold, the notification manager 212 may allow the notification to be delivered to the intended client device 202. The notification manger 212 may push the notification to the client device 202 for rendering, and the client device 202 may receive and render the notification.

At operation (312), the notification server determines whether the notification protection level is between the first threshold and a second threshold. In some embodiments, operation (312) may be similar in at least some aspects to operation (308). The notification server may compare the notification protection level to the first and second threshold. The notification server may determine whether the notification protection level is between the first and second threshold.

At operation (314), and in some embodiments, the notification server modifies and allows the notification. In some embodiments, the notification server modifies the received notification according to the determined notification protection level. The notification server may include or retain information/data corresponding to the structure of notification data received from a notification source via an API. The notification server may identify portions of the notification (e.g., received at operation (302)) which contain content of the notification. The notification server may remove, encode, or obfuscate at least part of the content of the notification. Such embodiments may secure the content of the notification, thus lessening the likelihood of interception and furthering DLP motivations.

The notification server may modify the notification by manipulating, modifying, replacing, removing, altering, or otherwise changing the notification data received from the notification source(s). In some embodiments, the notification server may encode at least some of the notification data. The notification server may change the notification data corresponding to the content of the notification. For instance, the notification server may modify the notification data to remove the content (e.g., sensitive, confidential data) from the notification (while maintaining certain identification information, such as an identification of the source, a time of the notification, and so forth). The notification server may modify the notification data to obfuscate some portion of the content of the notification. The notification server may modify the notification data to encrypt, secure, or otherwise encode the content of the notification. In each of these embodiments, the notification server may modify or change one or more aspects of the notification based on the notification protection level.

In some embodiments, the notification server may block the notification from being sent to the client device, deactivate notifications on the client device, or deactivate a feature of the client device for previewing/displaying/rendering of message content, if the notification server is incapable of modifying the received notification according to the determined notification protection level. The notification server may determine whether the notification data from the notification server is modifiable. The notification server may determine whether the notification data is modifiable based on whether the notification server includes information corresponding to the structure of the notification data, whether the notification server can identify the data corresponding to the content of the notification, and so forth.

Where the notification server cannot modify the notification data, in some embodiments, the notification server may generate a signal for transmission to the client device 202 that is to receive the notification. The signal may be a signal which, when received by the client device, causes the client device to modify one or more settings of the client device. The settings may be or include, for instance, settings corresponding to a feature for previewing/displaying/rendering message content in a notification, settings to disable notifications, and so forth. The notification server may generate the signal for transmission to the client device rather than (or in conjunction with) blocking the notification. For instance, the notification server may generate the signal when the notification protection level indicates the client device has been idle for an extended period of time, the authorized user is not near the client device, the client device is in an unsecure location, and so forth. The notification server may generate the signal based on the comparison of the notification protection level to the second threshold (described above). For instance, the notification server may generate the signal when the notification protection level is, for instance, greater than the second threshold. In each of these embodiments, the signal may disable the feature for previewing/displaying/rendering the message content of the notification, disable notifications on the client device, etc. In such embodiments, the notification may (or may not) be delivered to the client device. However, the content of the notification would not be rendered on the screen of the client device.

At operation (316), and in some embodiments, the notification server manages delivery of the notification to the client device by blocking the notification to the client device. In some embodiments, the notification server blocks the received notification according to the determined notification protection level. The notification server may block the notification received from the notification source(s). The notification server may block the notification received from the notification source(s) from being sent to the intended client device. In some embodiments, the notification server may intercept the notification and prevent the notification from delivery to the client device. The notification server may block the received notification when the notification protection level indicates the client device has for instance been idle for an extended period of time, the authorized user is not near the client device, the client device is in an unsecure location, and so forth. The notification server may block the notification based on the comparison of the notification protection level to the second threshold (e.g., described above). For instance, the notification server may modify the notification when the notification protection level is, for instance, greater than the second threshold.

In some embodiments, the notification may be for rendering on a screen or other interface of each of a plurality of client devices. The notification server may allow, modify, or block the notification for each of the plurality of client devices according to a notification protection level determined for the corresponding client device. In such embodiments, the notification server may determine the notification protection level for each of the client devices, and selectively allow, modify or block the received notification(s)

according to the notification protection level determined for each of the corresponding client devices. As such, certain notifications may be allowed, modified, or blocked on a case-by-case basis according to the notification protection level determined for the respective client device.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, USB Flash memory, hard disk drive, etc.).

The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems.

Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method comprising:
   identifying, by a server, a state of a client device and a distance between the client device and another device;
   identifying, by the server based at least on the state and the distance, a protection level regarding notifications being rendered on the client device; and
   communicating, by the server based at least on the protection level, a notification to the client device, the notification being received by the server for rendering on the client device.

2. The method of claim 1, further comprising identifying, by the server, that the state is one of idle or not in use.

3. The method of claim 1, further comprising determining, by the server, the protection level by application of a function to the distance and the state.

4. The method of claim 1, further comprising determining, by the server based at least on protection level, to modify at least a portion of content of the notification prior to communication of the notification.

5. The method of claim 1, further comprising determining, by the server based at least on the protection level, to block the notification from being communicated to the client device.

6. The method of claim 1, further comprising determining, by the server based at least on the protection level, to allow the notification to be communicated for rendering on the client device.

7. The method of claim 1, further comprising comparing, by the server, the protection level with one or more thresholds and responsive to the comparison, selectively block, allow or modify the notification.

8. The method of claim 1, wherein a value of the protection level indicates a risk associated with rendering the notification on the client device.

9. A server comprising:
   one or more processors, coupled to memory and configured to:
      identify a state of a client device and a distance between the client device and another device;
      identify, based at least on the state and the distance, a protection level regarding notifications being rendered on the client device; and
      communicate, based at least on the protection level, a notification to the client device, the notification being received by the server for rendering on the client device.

10. The server of claim 9, wherein the one or more processors are further configured to identify that the state is one of idle or not in use.

11. The server of claim 9, wherein the one or more processors are further configured to determine the protection level by application of a function to the distance and the state.

12. The server of claim 9, wherein the one or more processors are further configured to determine, based at least on protection level, to modify at least a portion of content of the notification prior to communication of the notification to be rendered on the client device.

13. The server of claim 9, wherein the one or more processors are further configured to determine, based at least on the protection level, to block the notification from being communicated to the client device.

14. The server of claim 9, wherein the one or more processors are further configured to determine, based at least on the protection level, to allow the notification to be communicated for rendering on the client device.

15. The server of claim 9, wherein the one or more processors are further configured to compare the protection level with one or more thresholds and responsive to the comparison, selectively block, allow or modify the notification.

16. The server of claim 9, wherein a value of the protection level indicates a risk associated with rendering the notification on the client device.

17. A system comprising:
   one or more servers in communication with a client device and one or more sources of notifications to be communicated to the client device, the one or more servers configured to:
   assign a first value to contextual information about the client device;

assign a second value to a proximity between the client device and another device;

generate a third value indicative of a protection level based at least on the first value and the second value, the protection level indicates a risk associated with rendering a notification on the client device; and communicate, based at least on the protection level, a notification to the client device, the notification being received by the server from one of the one or more sources of notifications.

18. The system of claim 17, wherein the one or more server are further configured to generate the third value of the protection level by applying a function to the first value and the second value.

19. The system of claim 17, wherein the one or more servers are further configured to compare the third value of the protection level with one or more thresholds and responsive to the comparison, selectively block, allow or modify the notification.

20. The system of claim 17, wherein the contextual information comprises at least one of: duration of the client device being in a stationary state, duration of the screen being in a darkened or low-power state, duration of the client device being in a locked state, whether the screen is covered by an accessory cover, duration since the client device was last unlocked, battery level of the client device, reputation of an application on the client device, category of the application, time or day of the notification, positioning-related information of the client device, whether the client device is in a trusted zone, or a Wi-Fi network of the client device.

* * * * *